(12) United States Patent
Tominaga et al.

(10) Patent No.: US 8,113,735 B2
(45) Date of Patent: Feb. 14, 2012

(54) JOINT STRUCTURE AND JOINING METHOD

(75) Inventors: Jun Tominaga, Kanagawa (JP); Ryohei Shigematsu, Kanagawa (JP); Masakatsu Nagashima, Kanagawa (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 294 days.

(21) Appl. No.: 11/887,414

(22) PCT Filed: Mar. 6, 2006

(86) PCT No.: PCT/JP2006/304266
§ 371 (c)(1),
(2), (4) Date: Sep. 28, 2007

(87) PCT Pub. No.: WO2006/112183
PCT Pub. Date: Oct. 26, 2006

(65) Prior Publication Data
US 2009/0263183 A1     Oct. 22, 2009

(30) Foreign Application Priority Data
Mar. 31, 2005 (JP) ................................. 2005-104465

(51) Int. Cl.
*F16D 1/072* (2006.01)
(52) U.S. Cl. ...................... 403/274; 403/278; 403/280
(58) Field of Classification Search .............. 403/274, 403/276–282, 285; 361/704–720
See application file for complete search history.

(56) References Cited

U.S. PATENT DOCUMENTS

| | | | | |
|---|---|---|---|---|
| 3,499,808 A * | 3/1970 | Obeda | ......................... | 156/580.2 |
| 4,646,203 A * | 2/1987 | Ngo et al. | ...................... | 361/708 |
| 5,085,083 A * | 2/1992 | Corr et al. | ........................ | 73/760 |
| 5,435,863 A * | 7/1995 | Frantz | .............................. | 156/64 |
| 5,902,426 A * | 5/1999 | Daly | ................................ | 156/64 |
| 6,182,527 B1 * | 2/2001 | Sander | ......................... | 29/527.4 |
| 6,297,961 B1 * | 10/2001 | Koizumi et al. | .............. | 361/720 |
| 6,370,027 B1 * | 4/2002 | Koizumi et al. | .............. | 361/720 |
| 7,341,394 B2 * | 3/2008 | Krimm et al. | ................. | 403/271 |
| 2009/0272480 A1 * | 11/2009 | Simon et al. | ..................... | 156/64 |

FOREIGN PATENT DOCUMENTS

| | | |
|---|---|---|
| JP | 58-086318 | 6/1983 |
| JP | 62-94028 | 6/1987 |
| JP | 4-063227 | 5/1992 |
| JP | 6-125423 | 5/1994 |
| JP | 07-127610 | 5/1995 |
| JP | 09-109267 | 4/1997 |

(Continued)

OTHER PUBLICATIONS

International Search Report for International Application No. PCT/JP2006/304266, dated May 16, 2006.

(Continued)

*Primary Examiner* — Victor MacArthur
(74) *Attorney, Agent, or Firm* — Edwards Wildman Palmer LLP

(57) ABSTRACT

A joining component is joined to a joint component. The joining component includes an insertion hole and two fitting holes. The joint component includes a fusible shaft at a position corresponding to the insertion hole and two protrusions at positions corresponding to the fitting holes. The joining component is placed on the joint component such that the fusible shaft is inserted into the insertion hole, and the protrusions fit into the fitting holes. The fusible shaft is then fused by using ultrasonic vibrations.

4 Claims, 6 Drawing Sheets

FOREIGN PATENT DOCUMENTS

| | | |
|---|---|---|
| JP | 2000-127248 | 5/2000 |
| JP | 2000-351159 | 12/2000 |
| JP | 2002-318386 | 10/2002 |
| JP | 2004-142136 A | 5/2004 |
| JP | 2006-076091 | 3/2006 |

OTHER PUBLICATIONS

Japanese Office Action, Jun. 19, 2007, issued in JP 2005-104465.
Extended European Search Report dated Aug. 30, 2011, for European Patent Application No. 06715286.8.

* cited by examiner

JOINT STRUCTURE AND JOINING METHOD

TECHNICAL FIELD

The present invention relates to a joint structure and a joining method.

BACKGROUND ART

In a conventional joint structure, a joint component made of synthetic resin is joined with a joining component made of material such as metal or synthetic resin in the following manner. The joint component is provided with a shaft, in the form of a pin, a boss, and the like, the joining component is provided with a hole, the shaft of the joint component is inserted in the hole in the joining component, and the shaft is fused to the joining component by using ultrasonic vibrations (see Patent Documents 1 and 2). The joint structure is advantageous in that the joint component formed of synthetic resin can be joined easily and quickly to the joining component formed of material such as metal or synthetic resin, regardless of material of the joining component.

Patent Document 1: Japanese Patent Application Laid-open No. 2000-127248

Patent Document 2: Japanese Patent Application Laid-open No. 2002-318386

DISCLOSURE OF INVENTION

Problem to be Solved by the Invention

In the conventional joint structure, as shown in FIG. 8, a joint component 2 is first placed in an aligning portion 1a formed on a base jig 1. The joint component 2 is formed of synthetic resin and includes a shaft 2a in the form of a pin, a boss, and the like. The shaft 2a is inserted in a hole 3b formed in an overlapping portion 3a, and as shown in FIG. 9, so that the overlapping portion 3a of a joining component 3 overlaps the joint component 2. Thereafter, as shown in FIG. 10, the overlapping portion 3a is pressed with a pressing jig 4 which has a open portion corresponding to the shaft 2a. An ultrasonic horn 5 is pressed onto the top of the shaft 2a to apply ultrasonic vibrations that fuse the shaft 2a, and flatten the shaft 2a wider than the diameter of the hole 3b, thus joining together the joint component 2 and the joining component 3. Because the shaft 2a of the joint component is inserted into the hole 3b of the joining component 3, it is possible to position the joining component 3 with respect to the joint component 2.

In the conventional joint structure, the hole 3b of the joining component 3 is formed to be slightly larger than the shaft 2a of the joint component 2 so that there is only a small gap between the hole 3b and the shaft 2a, as shown in FIG. 11, so that the joint component 2 is appropriately positioned in correspondence with the joining component 3. However, in the conventional joint structure, when ultrasonic vibrations are applied to the shaft 2a through the ultrasonic horn 5 to join together the joint component 2 and the joining component 3, fusing of the shaft 2a is accompanied by softening of the shaft 2a, which leads to significant reduction in friction between the joint component 2 and the joining component 3. Such reduction in friction can lead to change in the relative positions of the joint component 2 and the joining component 3 and cause misalignment of the shaft 2a with the hole 3b.

If such misalignment occurs, and if the joint structure is in the state, as shown in FIG. 11, where the shaft 2a and the hole 3b touch each other after joining of the joint component 2 and the joining component 3, stress is higher at the portion where the shaft 2a and the hole 3b touch each other when the joint structure is used. Therefore, if such joint structure is used over a longer period of time, a crack C may develop in the shaft 2a where it touches the hole 3b and the shaft 2a is damaged, which undermines the long term reliability of the joint structure.

The present invention has been achieved to solve the above problems in the conventional technology and it is an object of the present invention to provide a joint structure and a joining method capable of positioning a joint component with respect to a joining component with high accuracy, and preventing occurrence of places of high stress in a shaft of the joint component after joining.

Means for Solving Problem

To solve the above problems, and to achieve the above objects, a joint structure includes a joining component that includes an insertion hole; and a joint component that is formed of synthetic resin, and includes a fusible shaft to be inserted in the insertion hole, the fusible shaft being configured to be fused by ultrasonic vibrations to join the joint component and the joining component, wherein the joint component and the joining component each include positioning members, at least in two places, which position the joint component and the joining component when engaged with each other.

Moreover, in a joint structure, in addition to the above invention, one of the joint component and the joining component includes protruding portions as the positioning members, and other one of the joint component and the joining component includes fitting holes as the positioning members.

Moreover, in a joint structure, in addition to the above invention, a diameter of the insertion hole and the fusible shaft is set such that a gap is formed between the insertion hole and the fusible shaft that interrupts contact between the insertion hole and the fusible shaft, the gap being larger than a gap formed between each of the protruding portions and corresponding one of the fitting holes when the protruding portions fit into the fitting holes.

Moreover, in a joint structure, in addition to the above invention, one of the protruding portions includes a positioning hole for positioning the joint component at a predetermined position, and the one of the protruding portion, the fitting hole, and the positioning hole are concentric.

Moreover, in a joint structure, in addition to the above invention, the joint component includes a positioning hole for positioning the joint component at a predetermined position, and one of the protruding portions is located closer to the fusible shaft than the positioning hole.

To solve the above problems, and to achieve the above objects, a joining method, which is a joining method of joining a joining component that includes an insertion hole, and a joint component that is formed of synthetic resin and includes a fusible shaft to be inserted in the insertion hole by fusing the fusible shaft by ultrasonic vibrations, the joining method includes a step of positioning the joint component and the joining component through positioning members, while the fusible shaft is inserted in the insertion hole of the joint component; and a step of positioning the joint component at a predetermined position through the positioning members, wherein the joint component and the joining component are positioned and joined such that a gap is formed between the insertion hole and the fusible shaft so as to interrupt contact between the insertion hole and the fusible shaft.

EFFECT OF THE INVENTION

Because positioning members are formed, at least in two places, to determine position of a joint component and a joining component, a portion for positioning the joint component and the joining component is separated from a portion for joining the joint component and the joining component. The joint structure and the joining method are able to prevent concentrated stress on the shaft of the joint component, after joining, by positioning a joint component with the joining component with high accuracy and ensuring sufficient gap to interrupt contact of a fusible shaft with an insertion hole.

EXPLANATIONS OF LETTERS OR NUMERALS

10 Joint structure
11 Joint component
11$a$ Body
11$b$ Leg
11$c$ Fusible shaft
11$d$, 11$e$ Protruding portion
11$f$ Positioning hole
11$g$, 11$h$ Positioning hole
12 Joining component
12$a$ Overlapping portion
12$b$ Body
12$c$ Insertion hole
12$d$, 12$e$ Fitting hole
12$f$ Engaging hole
13 Base jig
13$a$ Placing portion
13$b$, 13$c$ Positioning pin

BEST MODE(S) FOR CARRYING OUT THE INVENTION

Figure 1:
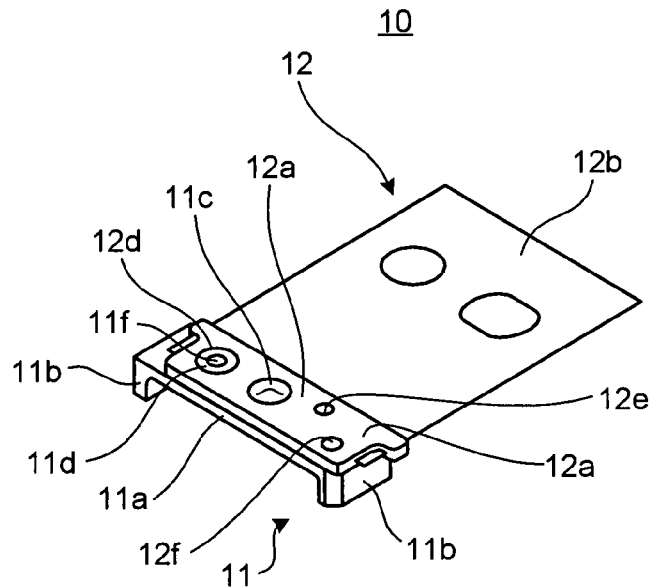
FIG. 1 is a perspective view of a joint structure according to an embodiment of the present invention.

A joint structure and a joining method according to an embodiment of the present invention are explained in detail below with reference to the accompanying drawings. FIG. 1 is a perspective view of a joint structure according to an embodiment of the present invention.

A joint structure 10 includes, as shown in FIG. 1, a joint component 11 and a joining component 12, which are joined together by a fusible shaft 11$c$ of the joint component 11 that is fused and its head portion is flattened.

The joint component 11 is formed of synthetic resin, and as shown in FIG. 1, has a short leg 11$b$ on either of two sides of a body 11$a$. The fusible shaft 11$c$ is arranged in the center (see FIG. 2) and protruding portions 11$d$ and 11$e$ are respectively arranged on either sides of the fusible shaft 11$c$ (see FIG. 2) on the upper surface of the body 11$a$. The protruding portion 11$d$ has wider diameter than that of the protruding portion 11$e$, and has a positioning hole 11$f$ at the center. The protruding portions 11$d$ and 11$e$ are of such a height that they slightly protrude out from fitting holes 12$d$ and 12$e$ when 11$d$ and 11$e$ are fitted in the fitting holes 12$d$ and 12$e$. In the joint component 11 is also formed a positioning hole 11$g$ at a position displaced from the protruding portion 11$e$ towards one of the legs 11$b$.

The joining component 12 includes an overlapping portion 12$a$ made of synthetic resin and a body 12$b$ made of metal. The overlapping portion 12$a$ overlaps the joint component 11, and has an insertion hole 12$c$ at the center. On the overlapping portion 12$a$, the fitting holes 12$d$ and 12$e$ are formed on either side of the insertion hole 12$c$ to correspond to the protruding portions 11$d$ and 11$e$, and an engaging hole 12$f$ is formed at a position corresponding to the positioning hole 11$g$. The fitting holes 12$d$ and 12$e$ serve as positioning members that position the joining component 12 with respect to the joint component 11 when fitted with the protruding portions 11$d$ and 11$e$. It may suffice that such fitting holes are formed in at least two positions.

Figure 2:
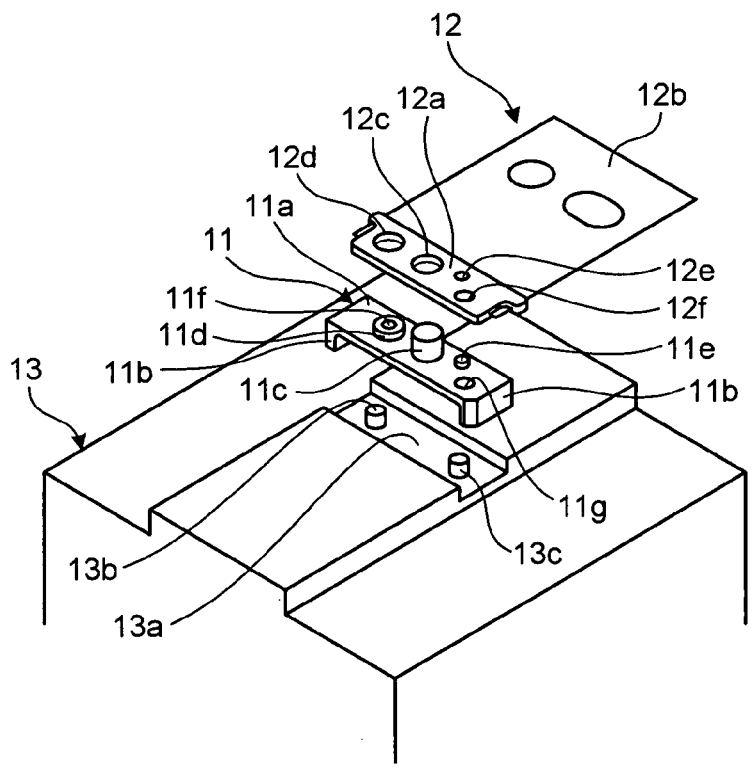
FIG. 2 is a perspective view for explaining a joining method of joining a joint component to a joining component according to the embodiment.

The joint structure 10 is configured, as explained below, by joining the joint component 11 and the joining component 12. First, the joint component 11 is placed on a base jig. Specifically, the joint component 11 is placed in a placing portion 13$a$, which is a groove-like depression formed in a base jig 13, as shown in FIG. 2. The placing portion 13$a$ is arranged with a positioning pin 13$b$ that engages the positioning hole 11$f$ and a positioning pin 13$c$ that engages the positioning hole 11$g$. The joint component 11 is positioned on the base jig 13 with the positioning pins 13$b$ and 13$c$.

Figure 3:
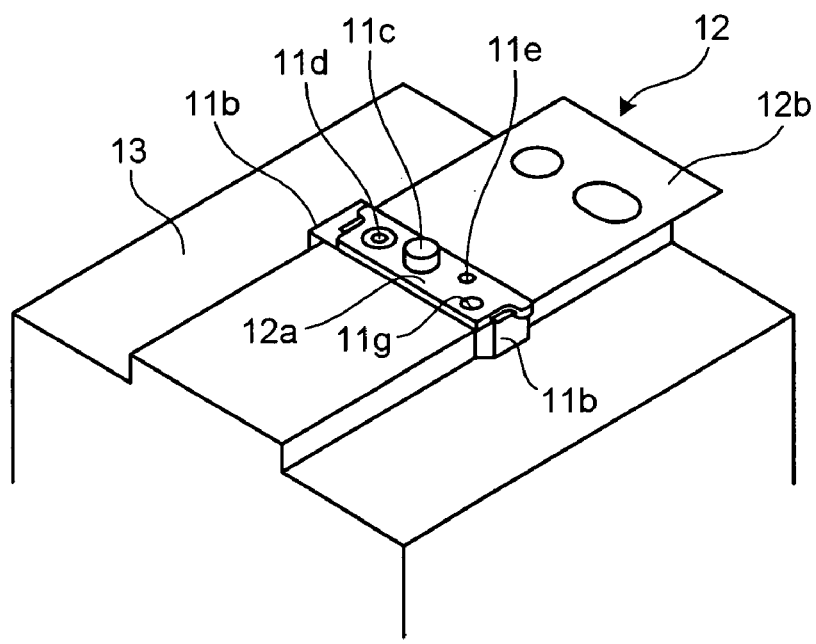
FIG. 3 is another perspective view for explaining the joining method.

The overlapping portion 12$a$ of the joining component 12 overlaps, from top, the joint component 11, placed on the base jig 13. The fusible shaft 11$c$ is inserted into the insertion hole 12$c$, and the protruding portions 11$d$ and 11$e$ respectively fit into the fitting holes 12$d$ and 12$e$ (see FIG. 3). Thus, position of the joining component 12 is determined with respect to the joint component 11. At such a time, the position of the joining component 12 is determined with respect to the joint component 11 at two points due to fitting of the protruding portions 11$d$ and 11$e$ into the fitting holes 12$d$ and 12$e$. Thus, rotation around the fusible shaft 11$c$ is restricted. The protruding portions 11$d$ and 11$e$ of the joint component 11 slightly protrude from the fitting holes 12$d$ and 12$e$ of the joining component 12.

Figure 4:
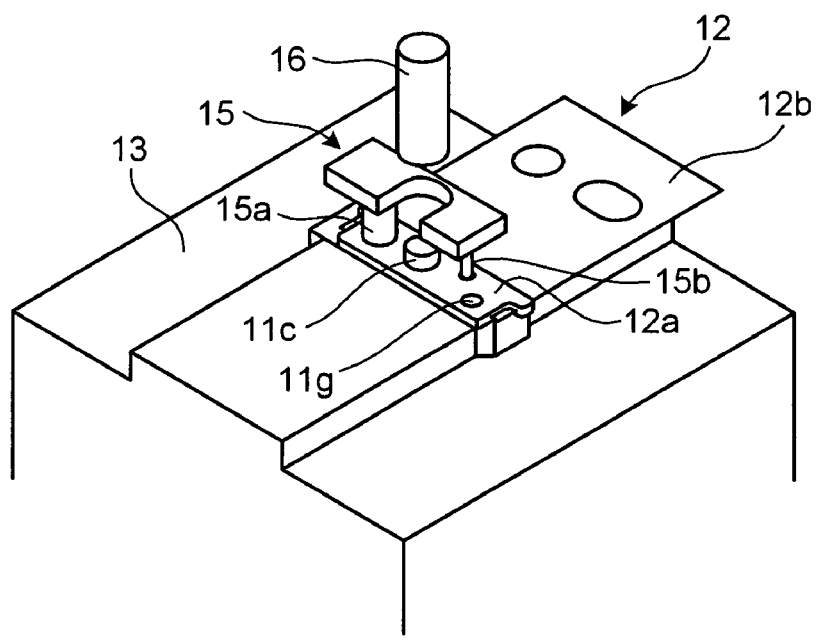
FIG. 4 is still another perspective view for explaining the joining method.
Figure 5:
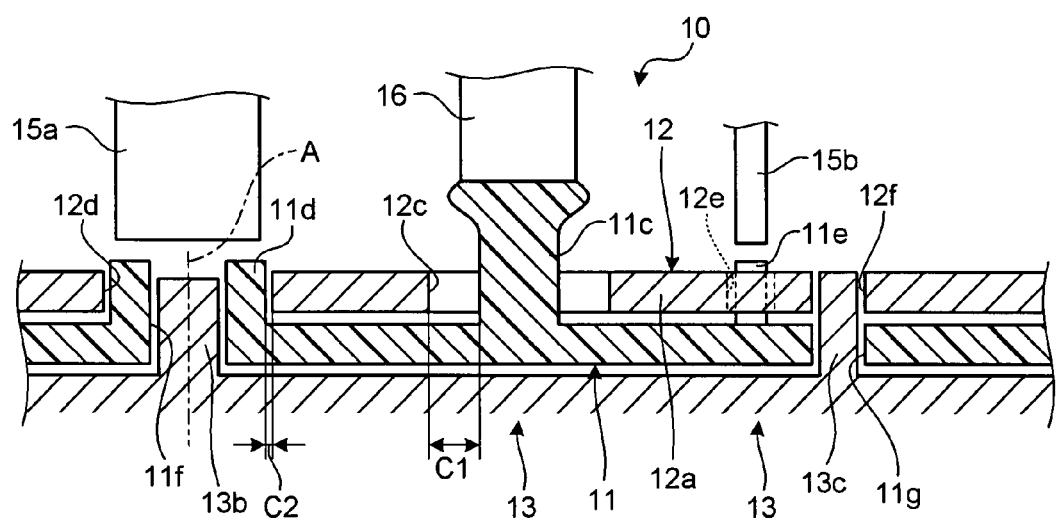
FIG. 5 is a cross section for explaining the joining method.

As shown in FIGS. 4 and 5, bosses 15$a$ and 15$b$ are brought in contact with the top of the protruding portions 11$d$ and 11$e$, which slightly protrude from the fitting holes 12$d$ and 12$e$, and the joint component 11 is pressed by a pressing jig 15 on the base jig 13. Thus, the joint component 11 is held on the base jig 13 by the pressing jig 15 while securing the joining component 12 thereto.

Figure 6:
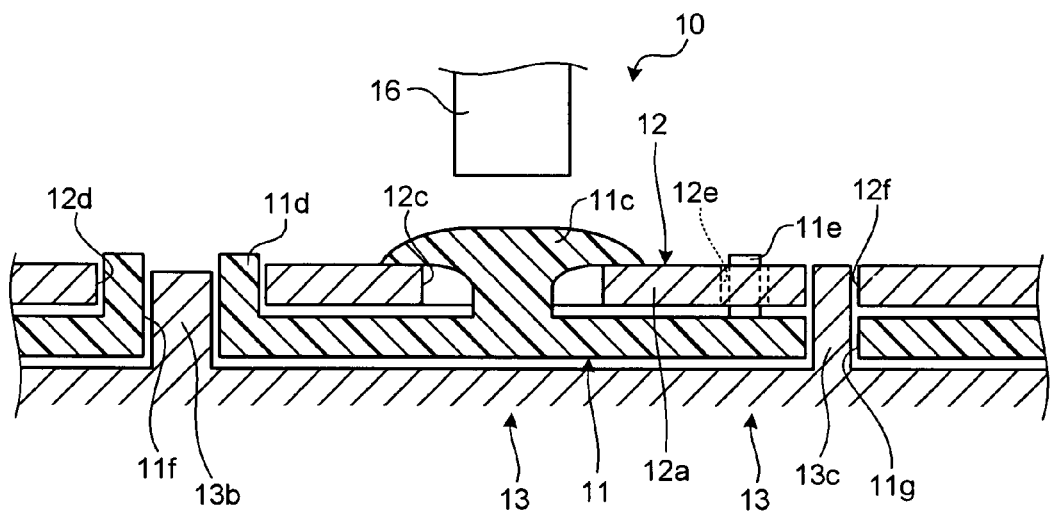
FIG. 6 is another cross section for explaining the joining method.

In such a state, an ultrasonic horn 16 is pressed onto the top of the fusible shaft 11$c$ to apply ultrasonic vibrations thereto. Thereafter, as shown in FIG. 5, the fusible shaft 11$c$ is fused, and the head portion of the fusible shaft 11$c$ is flattened by the ultrasonic horn 16 to be wider than the diameter of the insertion hole 12$c$ (see FIG. 6). Thus, the joint component 11 and the joining component 12 are joined to form the joint structure 10.

At this time, the joint component 11 and the joining component 12 are positioned with respect to each other with the protruding portions 11*d* and 11*e* being fitted in the fitting holes 12*d* and 12*e*. Therefore, the fitting holes 12*d* and 12*e* of the joining component 12 need to be formed with high accuracy so that gap is reduced between the protruding portions 11*d* and 11*e* and the fitting holes 12*d* and 12*e*. At the same time, it is better to engage the insertion hole 12*c* with the fusible shaft 11*c* by inserting the fusible shaft 11*c* into the insertion hole 12*c* and flattening its head after fusing. Therefore, according to the joint structure 10 and the joining method of the present invention, the fusible shaft 11*c* and the insertion hole 12*c*, as shown in FIG. 5, need to be set in such a manner that a gap that interrupts contact between the fusible shaft 11*c* and the insertion hole 12*c* is formed, after the fusible shaft 11*c* and the insertion hole 12*c* are joined. In other words, the diameters of the fusible shaft 11*c* and the insertion hole 12*c*, as shown in FIG. 5, need to be set in such a manner that a gap C1 between the fusible shaft 11*c* and the insertion hole 12*c* is larger than a gap C2 between the fitting hole 12*d* and the protruding portion 11*d* (C1>C2). The gap C1, between the fusible shaft 11*c* and the insertion hole 12*c*, is to be 5 to 15 times larger than the gap C2, between the fitting hole 12*d* and the protruding portion 11*d*, more preferably 7 to 12 times larger, and most preferably 8 to 10 times larger than the gap C2, between the fitting hole 12*d* and the protruding portion 11*d*. If the gap C1 between the fusible shaft 11*c* and the insertion hole 12*c* is of smaller width than five-times that of the gap C2 between the fitting hole 12*d* and the protruding portion 11*d*, a defect arises of the fusible shaft 11*c* touching the insertion hole 12*c* when the ultrasonic horn 16 fuses the fusible shaft 11*c*. On the other hand, if the gap C1, between the fusible shaft 11*c* and the insertion hole 12*c*, is of larger than 15-times the width of the gap C2 between the fitting hole 12*d* and the protruding portion 11*d*, a defect arises of requiring longer time for joining as the fusible shaft 11*c* is longer than the insertion hole 12*c*.

Therefore, according to the joint structure 10 and the joining method of the present invention, even if the fusible shaft 11*c* is fused and softened due to the ultrasonic vibrations at the time of joining the joint component 11 and the joining component 12, the position of the joint component 11 and the joining component 12 is not likely to change because, the position of the joint component 11 and the joining component 12 is determined by fitting the protruding portions 11*d* and 11*e* and the fitting holes 12*d* and 12*e* with each other. Therefore, even if diameter of the joint component 11 and the joining component 12 increases due to fusing, the joint component 11 and the joining component 12 are joined in such a way that there is enough space to form a gap between the fusible shaft 11*c* and the insertion hole 12*c* to interrupt contact between the fusible shaft 11*c* the insertion hole 12*c*. As a result, in the joint structure 10 and the joining method according to the present invention, when the joint structure 10 is used after joining the joint component 11 and the joining component 12, the fusible shaft 11*c* is not stressed by the overlapping portion 12*a*, and cracks do not occur in the fusible shaft 11*c* due to stress. The joint structure 10 and the joining method according to the present invention can be used for a long period of time and with high reliability.

In the joint structure 10 and the joining method according to the present invention, as shown in FIG. 5, the positioning pin 13*b* of the base jig 13 engages the positioning hole 11*f* of the protruding portions 11*d* that fits with the fitting hole 12*d*. The positioning pin 13*b*, the positioning hole 11*f*, and the fitting hole 12*d* are positioned on the same axis. Therefore, measurements of the joint component 11 and the joining component 12 in the joint structure 10 are managed by taking the position of the positioning pin 13*b* as a reference point, and misalignment is reduced between the protruding portions 11*d* and 11*e* and the fitting holes 12*d* and 12*e*. Thus, positioning accuracy is improved.

Figure 11:
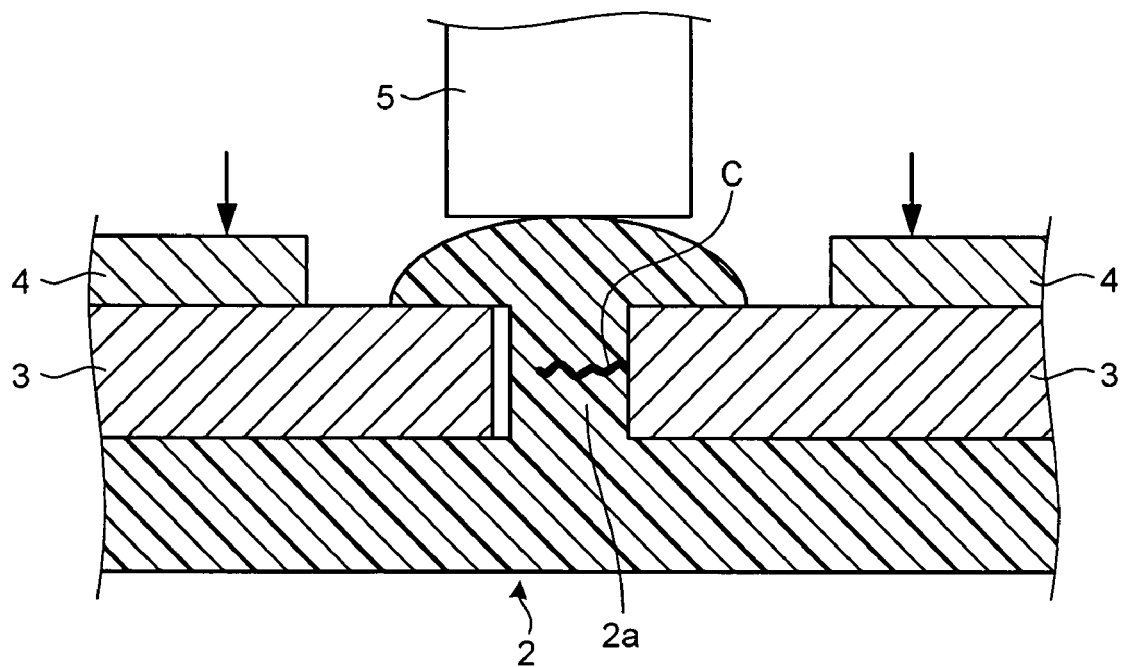
FIG. 11 is a cross section for explaining the problems in the conventional joining method.

Furthermore, in the joint structure 10 and the joining method according to the present invention, when ultrasonic vibrations are applied through the ultrasonic horn 16 to the fusible shaft 11*c*, while the joint component 11 is being pressed by the pressing jig 15 on the base jig 13, the joint component 11 and the joining component 12 are joined together. In such a case, ultrasonic vibrations applied to the fusible shaft 11*c* are not transmitted to the joining component 12 from the joint component 11. As compared to this, in the conventional joint structure, as shown with arrows in FIG. 11, the pressing jig 4 presses the joint component 2 to the base jig 1 through the joining component 3, and the joint component 2 and the joining component 3 are in close contact. Therefore, in the conventional joint structure, ultrasonic vibrations applied to the shaft 2*a* are diffused to the joining component 3. This results in energy loss in the ultrasonic vibrations introduced to the shaft 2*a*, thus, the shaft 2*a* is insufficiently fused and joining becomes unstable. When the joining component 3 includes a metallic portion or an electronic substrate, the metallic portion or the substrate resonates and the joining component 3 or the electronic portion is damaged.

In the case of the joint structure 10 the ultrasonic vibrations introduced to the fusible shaft 11*c* through the ultrasonic horn 16 are not transmitted to the joining component 12 from the joint component 11. As compared to the conventional joint structure, because the joint structure 10 of the present invention has the fusible shaft 11*c* that joins the joint component 11 and the joining component 12 the joint component 11 and the joining component 12 can be sufficiently fused, and stable joining is possible. Furthermore, when the joining component 12 includes a metallic portion or an electronic substrate, even if the ultrasonic vibrations are introduced to the fusible shaft 11*c*, the joining component 12 or the electronic portion is not damaged.

In the joint structure 10 and the joining method according to the present invention, the protruding portions 11*d* and 11*e* are pressed by the bosses 15*a*, 15*b* of the pressing jig 15, and the joint component 11 is maintained by the base jig 13. The ultrasonic vibrations are applied to the fusible shaft 11*c* to fuse the fusible shaft 11*c*, the head of the fusible shaft 11*c* is flattened so that it is larger than the diameter of the insertion hole 12*c*. Thus, the joint component 11 and the joining component 12 are joined.

Figure 7:
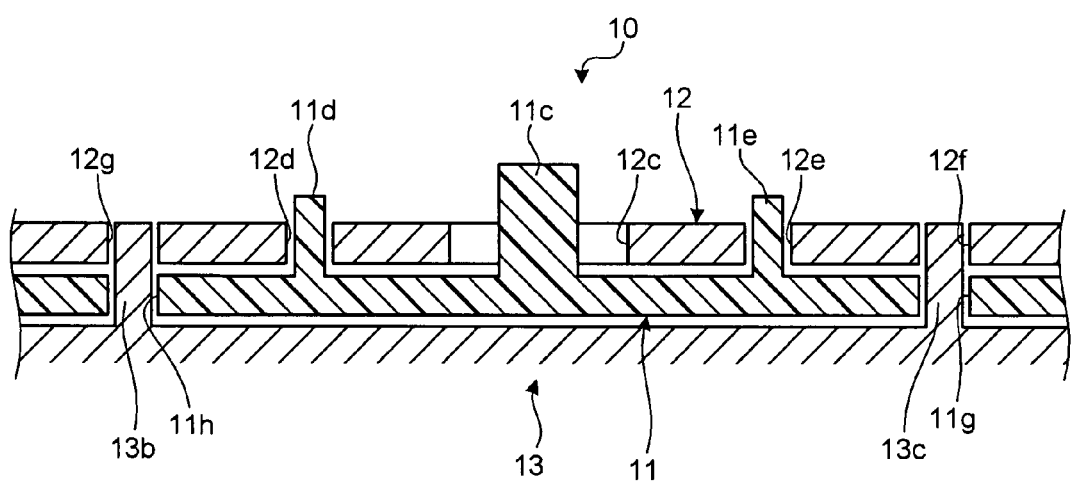
FIG. 7 is a cross section of a modification of the joint structure according to the present invention.
Figure 8:
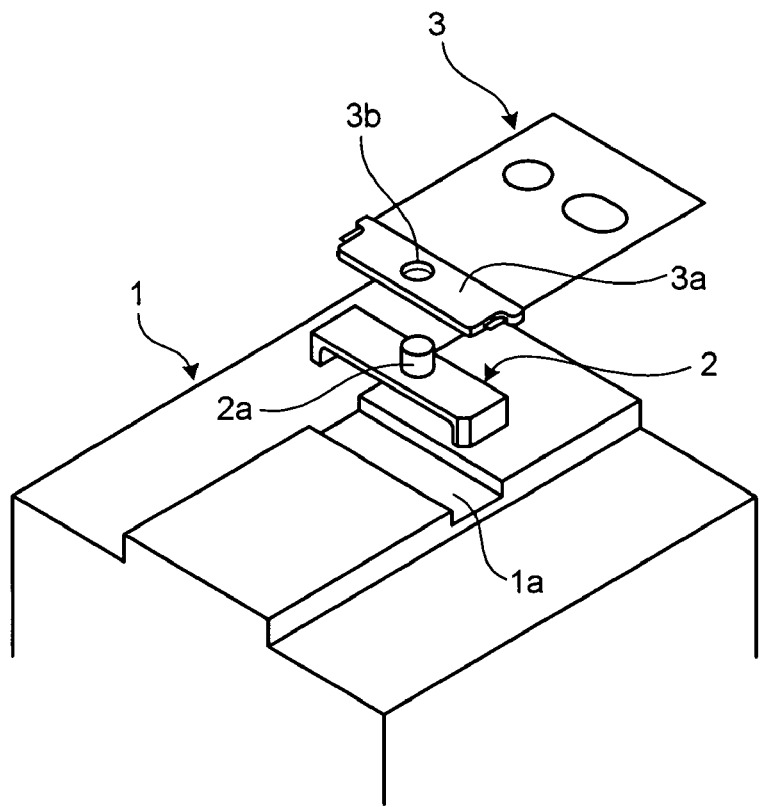
FIG. 8 is a perspective view for explaining a conventional joining method of joining a joint component to a joining component.
Figure 9:
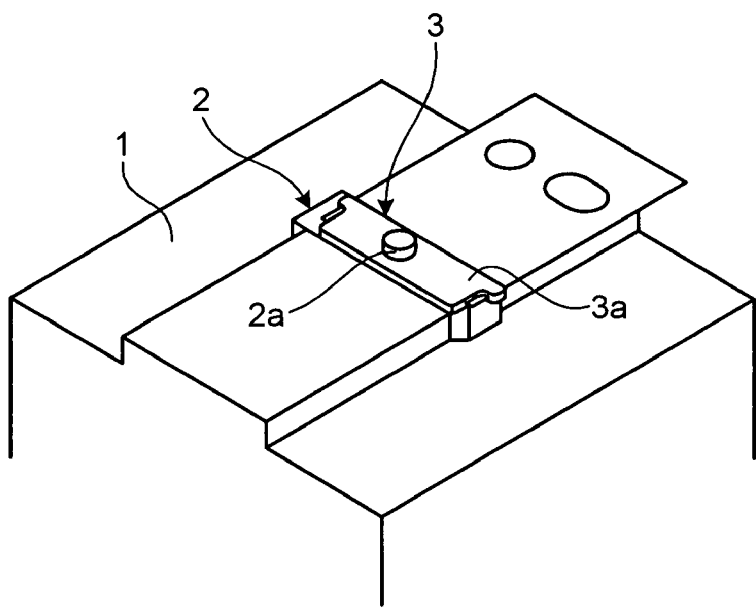
FIG. 9 is another perspective view for explaining the conventional joining method.
Figure 10:
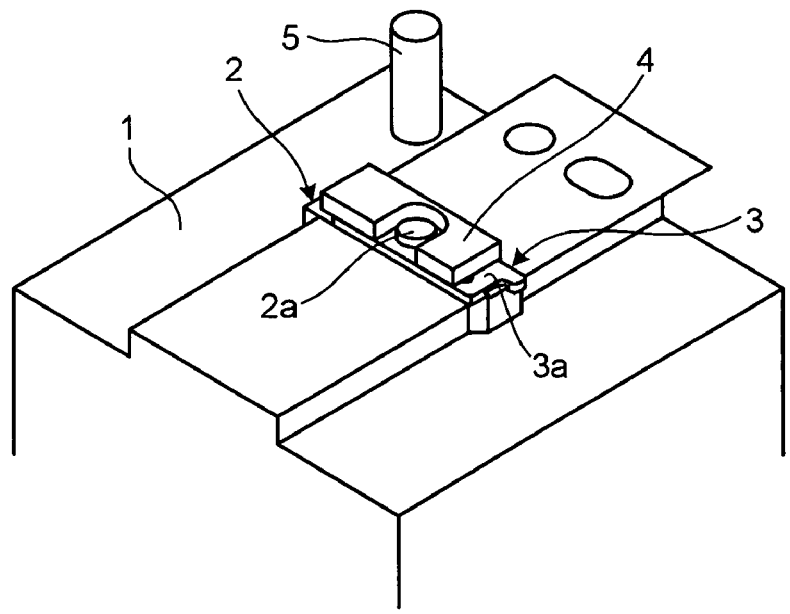
FIG. 10 is still another perspective view for explaining the conventional joining method.

Therefore, it is preferred that the protruding portions 11*d* and 11*e* of the joint component 11, as shown in FIG. 7, are to be positioned adjacent to the fusible shaft 11*c* rather than the positioning holes 11*g* and 11*h*. At such time, position of the joint component 11 and the joining component 12 is determined by engaging the positioning pin 13*b* with the positioning holes 11*h* and 12*g*, and engaging the positioning pin 13*c* with the positioning holes 11*g* and the engaging hole 12*f*.

In the above mentioned embodiment, height of the protruding portions 11*d* and 11*e* of the joint component 11, when engaged with the fitting holes 12*d* and 12*e* is set slightly higher than the overlapping portion 12*a*. However, the height of the protruding portions 11*d* and 11*e* of the joint component 11 need not be higher than the overlapping portion 12*a* when the protruding portions 11*d* and 11*e* can be pressed by the bosses 15*a*, 15*b* of the pressing jig 15.

The protruding portions 11*d* and 11*e* are positioning members of the joint component 11. The fitting holes 12*d* and 12*e* of the joining component 12 engage the protruding portions 11d and 11e to determine position of the joining component 12 with respect to the joint component 11. When ultrasonic vibrations are introduced to the fusible shaft 11c, and if the joint component 11 can be made immovable by pressing the pressing jig 15, the positioning members in the joint component 11 can be positioning holes and the fitting members in the joining component 12 can be the protruding portions. In such a case, engaging holes are formed on the joining component 12 so that the protruding portions are to engage the positioning pins 13b and 13c of the base jig 13. The joint component 11 is positioned on the base jig 13 by engaging the positioning holes 11f, 11g and the positioning pins 13b and 13c. However, a positioning depression can be formed on the base jig 13 and an engaging protrusion that engages the positioning depression can be formed in the joint component 11.

INDUSTRIAL APPLICABILITY

The joint structure and the joining method according to the present invention are useful in forming a joint structure that includes a joint component formed of synthetic resin, which is joined with a joining component made of metal or synthetic resin. Specifically, the joint structure and the joining method are excellent in accuracy of positioning of the joint component and the joining component, and are suitable to manufacture a joint structure, in which, occurrence of high stress can be avoided on a shaft of the joint component after joining.

The invention claimed is:

1. A joint structure comprising:
a joint component formed of synthetic resin and having a fusible shaft; and a joining component having an insertion hole into which the fusible shaft is inserted,
wherein the joint component and the joining component are joined together by applying ultrasonic vibrations to the fusible shaft inserted into the insertion hole to fuse the fusible shaft, each of the joint component and the joining component has at least two positioning members for positioning the joint component and the joining component,
the positioning members of the joint component and the positioning members of the joining component are protruding portions and fitting holes, respectively, or fitting holes and protruding portions, respectively, and
diameters of the insertion hole and the fusible shaft are set such that a gap C1 is formed between the insertion hole and the fusible shaft that interrupts contact between the insertion hole and the fusible shaft, the gap C1 being 5 to 15 times larger than a gap C2 formed between each of the protruding portions and corresponding one of the fitting holes.

2. The joint structure according to claim 1, wherein a first protruding portion among the protruding portions includes a first positioning hole, and the first protruding portion, a fitting hole corresponding to the first protruding portion, and the first positioning hole are concentric.

3. The joint structure according to claim 1, wherein the joint component includes a positioning hole for positioning the joint component at a predetermined position, and one of the protruding portions is located closer to the fusible shaft than the positioning hole.

4. The joint structure according to claim 1, wherein a top of each protruding portion fitted in each fitting hole, protrudes from the fitting hole.

* * * * *